(12) United States Patent
Achhammer et al.

(10) Patent No.: US 6,396,390 B1
(45) Date of Patent: May 28, 2002

(54) DEVICE FOR DETECTING A KEY INSERTED INTO A MOTOR VEHICLE LOCK

(75) Inventors: Siegfried Achhammer, Regensburg; Jürgen Schweiger, Pentling, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/184,176

(22) Filed: Nov. 2, 1998

(30) Foreign Application Priority Data

Oct. 31, 1997 (DE) .......................... 197 48 329

(51) Int. Cl.[7] ............................... H04Q 5/22
(52) U.S. Cl. .................. 340/10.33; 340/10.34; 340/5.61; 359/143
(58) Field of Search ................... 340/5.2, 5.72, 340/5.73, 5.61, 10.33, 10.34; 455/343; 359/143

(56) References Cited

FOREIGN PATENT DOCUMENTS

| DE | 4414734 C2 | 10/1996 |
|---|---|---|
| DE | 19539852 C1 | 10/1996 |
| EP | 0062851 A1 | 10/1982 |
| EP | 0065650 B1 | 12/1982 |
| EP | 0115747 A1 | 8/1984 |

*Primary Examiner*—Michael Horabik
*Assistant Examiner*—M Shimizu
(74) *Attorney, Agent, or Firm*—Laurence A. Greenberg; Werner H. Stemer; Ralph E. Locher

(57) ABSTRACT

A device for detecting a key inserted into a motor vehicle lock includes a transmitter and a receiver connected to a micro-processor and a circuit connected directly between the transmitter and receiver and bypassing the microprocessor. When the key is inserted in the lock, the key communicates over a communications link with a lock-end interrogation device emitting intermittent interrogation pulses. The receiver activates the circuit upon receiving an interrogation pulse and actuates the transmitter to transmit a response pulse in response to the interrogation pulse. A key has a system for detecting whether it is inserted in a motor vehicle lock and includes a microprocessor, and a circuit connected directly between a transmitter and a receiver for sensing externally fed-in signals and bypassing the microprocessor. The circuit controls the transmitter to generate a response pulse when an interrogation pulse is received by the receiver, the response pulse being generated without involvement of the microprocessor.

17 Claims, 1 Drawing Sheet

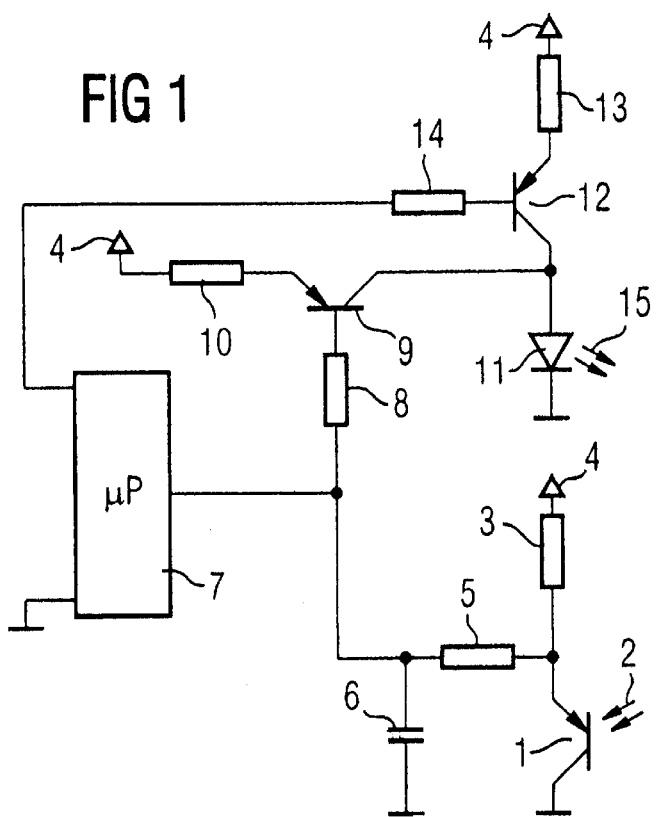
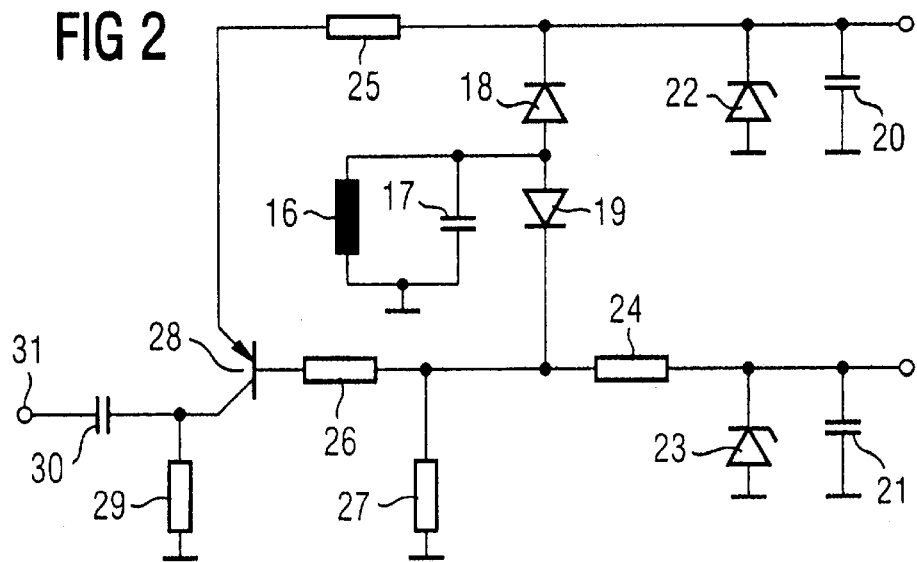

DEVICE FOR DETECTING A KEY INSERTED INTO A MOTOR VEHICLE LOCK

BACKGROUND OF THE INVENTION

Field of the Invention

The invention relates to a device for detecting a key which has been inserted into a lock of a motor vehicle, in particular into its ignition lock, and to a correspondingly configured key.

Keys, in particular ignition keys of motor vehicles, are nowadays increasingly equipped with electronic components which permit communication with systems disposed at the lock end, for example control units of electronic ignition systems. The electronic keys are distinguished by an increased level of protection against counterfeiting, so that unauthorized use of the system can be prevented with improved probability.

U.S. Pat. No. 5,808,372 to Schwegler et al. (German patent DE 195 39 852 C1) discloses a system in which an ignition key and a motor vehicle functional unit communicate with one another. The key is equipped with a long-range communications channel for transmitting remote-control commands and with a further, short-range communications channel via which it is in communication with an ignition-lock-end control circuit. The state in which the ignition key is inserted in the ignition lock can be sensed on the basis of a transmission of data information via the short-range communications channel. The key contains a transmitter and a receiver which are connected to a logic control circuit and are controlled thereby.

German patent DE 44 14 734 C2 discloses a circuit arrangement for sensing the switching states of motor vehicle activation means, in particular in the form of a keyless motor vehicle lock system with a transponder that is carried by the user. The circuit contains a generator which intermittently generates pulses for switching on and off a voltage supply main switch, and a microprocessor (logic control unit) for controlling various functions when an activation of the activation means is sensed.

European patent application EP 0 115 747 A1 discloses an immobilizer which can be activated by an electronic key which can be inserted into a fixed receptacle section, signals being transmitted by varying the impedance of inductors. By means of the inductive coupling between the electronic key and the fixed receptacle section it is possible to transmit both data and supply energy to the key. The vehicle-end interrogation device is continuously active and generates an output signal of constant amplitude as long as there is no key introduced into the receptacle section. If the key is inserted, there is, owing to the magnetic coupling, a change in the output signal of the interrogation device by means of which it is possible to check the presence and the correctness of the inserted key.

U.S. Pat. No. 4,486,806 to Mochida et al. (European patent EP 0 065 650 B1) discloses an electronic door locking system for motor vehicles. There, the position of the ignition lock, and thus the position of the ignition key, is interrogated and the door lock system is controlled as a function of the position of the ignition key. Furthermore, Mochida et al. teach how to determine whether the ignition key is still in the ignition lock and, if this is the case, to disable the generation of a door locking signal. In all these cases it is necessary to detect whether or not the key is inserted into the lock.

SUMMARY OF THE INVENTION

It is accordingly an object of the invention to provide a device for detecting a key which has been inserted into a motor vehicle lock, which overcomes the above-mentioned disadvantages of the heretofore-known devices and methods of this general type and which permits quick and reliable key detection with little expenditure and provides for a high degree of reliability.

With the foregoing and other objects in view there is provided, in accordance with the invention, a device for detecting a key inserted into a lock of a motor vehicle, wherein, when the key is inserted in the lock, the key communicates via a communications link with a lock-end interrogation device emitting intermittent interrogation pulses, the device which comprises:

a microprocessor, a transmitter connected to the microprocessor, and a receiver connected to the microprocessor; and a circuit arrangement connected directly between the transmitter and the receiver and bypassing the microprocessor, the receiver activating the circuit arrangement upon receiving an interrogation pulse and actuating the transmitter to transmit a response pulse in response to the interrogation pulse.

The receiver and the transmitter of the key are connected to one another directly via a circuit arrangement which, when the interrogation pulse is received, can activate the transmitter immediately or else with a time delay, in order to generate the response pulse. The outputting of the response pulse is thus implemented purely by means of circuitry so that the reaction time of the key is very short, that is to say the response pulse is generated very quickly, and the current consumption of the key still remains low. The generation of the response pulse thus requires no software support so that the microprocessor in the key can remain in the stand-by mode (power-down mode) during this interrogation "is key inserted?". The energy requirement is thus minimized.

The interrogation pulses are emitted intermittently, i.e. at regular or irregular time intervals, by the lock-end interrogation device, i.e. the interrogation device in the motor vehicle, and are replied to with short response pulses by the key inserted in the lock, said pulses being preferably transmitted via the communications link, for example an infrared link, a radio link of a remote-control system which may be in the key or of a communications link of inductive design, and being evaluated in the interrogation device, that is to say in the evaluating logic which is in the motor vehicle, as an indication that the key is inserted.

In the embodiment according to the invention there is thus no need for an additional sensor such as a mechanical push button switch, a Reed contact, a Hall sensor, a photoelectric barrier etc. The inserted state of the key is sensed via the functional components which are already provided in the system for other purposes.

The intermittent interrogation may take place cyclically, for example at time intervals of 50 ms or greater, so that there is no appreciable increase in the quiescent current of the interrogation device and the interrogation device can also remain permanently activated even when the ignition is switched off. Since the interrogation takes place very quickly, the insertion of a key into the ignition lock can be detected very rapidly so that no significant system delay times occur.

In accordance with an added feature of the invention, the circuit arrangement is adapted to time an end of the response pulse to lie after a trailing edge of the interrogation pulse. In other words, the end of the response pulse is delayed in relation to the end of the interrogation pulse so that the interrogation device (evaluation logic) can distinguish the response pulse clearly from interference signals which are generated by reflections or other influences of the interrogation pulse, but drop away immediately to zero at the end of the interrogation pulse.

For this purpose, the circuit arrangement may contain a timing element which delays the switching off of the response pulse so that the response pulse persists for a certain time period after the interrogation pulse has already ended.

The key may be provided with a battery, implemented for example as an accumulator, which makes available the energy necessary for outputting the response pulse and also ensures the energy supply for the further components contained in the key, for example the microprocessor. Alternatively, the energy necessary for outputting the response pulse may also be drawn by the key by means of inductive supply from the interrogation device, for example the evaluating control unit. For this purpose, the key then preferably has an LC oscillatory circuit with energy accumulator connected downstream.

In accordance with an additional feature of the invention, the receiver is an infrared receiver or an inductive antenna, and the transmitter is an infrared transmitter or a radio-frequency transmitter.

In accordance with another feature of the invention, the circuit arrangement is a timing element—such as an RC element—adapted to delay a switching off of the response pulse in relation to a trailing edge of the interrogation pulse.

In accordance with a further feature of the invention, the receiver includes an LC oscillatory circuit, and including an energy accumulator connected to and chargeable by the LC oscillatory circuit, and wherein the circuit arrangement is adapted to respond to an interrogation pulse sensed by the LC oscillatory circuit and to generate a response pulse in reaction thereto.

As noted above, the transmitter and receiver of the key may be designed as infrared transmitters or infrared receivers, the interrogation device (evaluation logic of the motor vehicle) being likewise provided with an infrared transmitter for generating the interrogation pulses and with an infrared receiver for acquiring the response pulses. The infrared link is designed here preferably as a bidirectional infrared link via which not only the interrogation and response pulses but also, if appropriate, additional information can be exchanged between the key and the motor vehicle. Alternatively, the communications link may also be designed as a radio link, the key and the evaluation logic being equipped with appropriate RF transmitters and RF receivers. Here, the appropriate pulses may be exchanged by means of inductive antennas of the key and/or of the interrogation device. The radio link of a remote-control system which may be in the key, or an inductive link, may thus be used to generate the response pulses.

In accordance with an alternative feature of the invention, the receiver includes an inductive input circuit, and including an interrogation device containing an inductive output circuit, and wherein the response pulses generated by the transmitter consist in a change in a load resistance over time, leading to corresponding change in a detuning of the inductive output circuit of the interrogation device caused by the detuning of the inductive input circuit of the key. In other words, if the interrogation device is equipped with an inductive output circuit, and the key contains an inductive input circuit, the response pulse generated by the key may also merely take the form of the detuning which occurs in the inductive output circuit of the interrogation device (for example control unit) in the presence of the inductive load of the input oscillatory circuit of the key. The interrogation device can sense and evaluate this detuning as a clear indication of the presence of the key. The "response pulses" consist, in this case, in the change in the energy of the field over time which is brought about by the inductive input circuit of the key in comparison with the situation in which the key is not inserted. The inductive output circuit of the interrogation device and the inductive input circuit of the key are provided here for the wireless energy supply and do not constitute additionally necessary components.

In accordance with again a further feature of the invention, the load resistance changes at a specific frequency or in accordance with a coded item of information.

So that the presence of the key can be detected even more reliably, the key preferably changes its load resistance over time, for example with a specific frequency or in accordance with a specific item of coded information. This change in the load resistance can be effected, for example, by cyclically short-circuiting or switching off inductive sections of the inductor in the input circuit or else in some other way. These load changes which take place with a specific frequency or according to a predefined pattern lead to corresponding changes in the detuning, in the form of a corresponding, superimposed modulation, in the evaluation logic. The presence of this superimposed modulation provides for the evaluation logic the clear information that the key is now inserted and that there are, for example, no interference effects or other inductive loads.

With the above and other objects in view there is also provided, in accordance with the invention, a key for a motor vehicle with a system for detecting whether the key is inserted in a lock of the motor vehicle, comprising:

a receiver for sensing externally fed-in signals, a microprocessor and a transmitter for transmitting signals to an outside of the key;

a circuit arrangement connected directly between the transmitter and the receiver and bypassing the microprocessor, the circuit arrangement controlling the transmitter to generate a response pulse when an interrogation pulse is received by the receiver.

In accordance with again an additional feature of the invention, the circuit arrangement includes a timing element for delaying a trailing edge of the response signal relative to a trailing edge of a received signal.

In accordance with again an alternative feature of the invention, the circuit arrangement responds to a trailing edge of a received signal and generates a response pulse in reaction thereto.

In accordance with a concomitant feature of the invention, there is provided, in combination with a motor vehicle and a key for the motor vehicle, a device for detecting whether the key is inserted into a lock of the motor vehicle, such as the ignition lock. The system comprises:

a communications link between the key and the motor vehicle whereby, when the key is inserted in the lock, the key communicates via the communications link with a lock-end interrogation device emitting intermittent interrogation pulses;

a microprocessor, a transmitter connected to the microprocessor, and a receiver connected to the microprocessor; and a circuit arrangement connected directly between the transmitter and the receiver and bypassing the microprocessor, the receiver activating the circuit arrangement upon receiving an interrogation pulse from the lock-end interrogation device and actuating the transmitter to transmit a response pulse to the interrogation device in response to the interrogation pulse.

The invention is preferably used for detecting the inserted state of the ignition key into the ignition lock of a motor vehicle, but can also be used in the case of a door lock for sensing the insertion of the motor vehicle key.

The invention can be used in electronic keys with inductive energy supply, for example with transponder systems or with remote-control systems which are based on radio or infrared, in which case a bidirectional radio-frequency or infrared interface with the interrogation device (control unit), for example of an electronic ignition system, may also be provided.

The invention may alternatively or additionally also be used for controlling an immobilizer of the motor vehicle which is activated as soon as the interrogation device determines that the ignition key has been withdrawn (and, if appropriate, further preconditions are also fulfilled), and which can be activated only if one or more correct response pulses have been obtained, that is to say the ignition key has been inserted again.

Other features which are considered as characteristic for the invention are set forth in the appended claims.

Although the invention is illustrated and described herein as embodied in a device for detecting a key inserted in a motor vehicle lock, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a circuit schematic of an embodiment of those components of an exemplary embodiment of the novel device which are located in the key; and FIG. 2 is a circuit schematic of a modified embodiment of the key-side components of a further exemplary embodiment of the device.

DESCRIPTION OF THE PREFERRED EMBODIMENTS

Before specific reference is had to the figures of the drawing it is noted, first, that components in the evaluation logic, for example a control unit, of the motor vehicle are not illustrated so as not to unnecessarily expand the description. The exemplary embodiment operates with infrared communications transmission, the interrogation device being provided with an infrared transmitter and an infrared receiver which are connected to a microprocessor. The microprocessor controls the infrared transmitter at intermittent, preferably cyclical, intervals of, for example, 50 ms, causing it to emit an interrogation pulse. The microprocessor evaluates the response signals obtained via the infrared receiver. The interrogation cycle may also be shorter or longer and may comprise, for example, 10 ms or 100 ms. Shorter interrogation cycles lead, however, to an increased current consumption. Extended interrogation cycles increase the reaction delay between the insertion of the ignition key and the time when it is sensed. The interrogation pulse is repeated in uninterrupted cycles over the entire duration of the switched-off state of the motor vehicle, preferably also when the ignition key is inserted, so that the insertion and withdrawal of the key can be sensed at the correct times and the control unit can control appropriate measures, for example the deactivation and activation of an immobilizer, in a suitably timed fashion.

Referring now to the figures of the drawing in detail and first, particularly, to FIG. 1 thereof, there is seen an exemplary embodiment that contains at the key end an infrared receiver 1 (e.g. a photodetector) that detects infrared light 2 which has been generated by the vehicle-end infrared transmitter. The infrared receiver 1 is connected to a supply voltage 4 via a resistor 3. A timing element 5, 6 is connected to the node between the resistor 3 and the infrared receiver 1. The timing element is an RC circuit containing a resistor 5 and a capacitor 6 which is connected in series with the latter and whose other terminal is at ground potential.

The node between the resistor 5 and the capacitor 6 is connected on the one hand to an input of a microprocessor module 7 and on the other hand to a resistor 8 which is connected by its other terminal to the base of a switching transistor 9. The microprocessor module 7 performs the control operations of the various key functions. In particular, the module 7 evaluates the received information and generates the information to be transmitted, and also contains, for example, authentication codes for checking the correct relationship between the key and vehicle. The switching transistor 9 is connected, on the one hand, to the supply voltage 4, for example to a battery in the key or an accumulator, via a resistor 10, and on the other hand to the anode of an infrared transmitter 11 in the form of an infrared light-emitting diode. The infrared transmitter 11 is connected to the supply voltage 4 via a switching transistor 12 and a resistor 13. The base of the switching transistor 12 is connected to an output of the microprocessor module 7 via a resistor 14. The microprocessor module 7 can thus actuate the switching transistor 12 according to the information to be transmitted to the motor vehicle infrared receiver during normal operation, so that the infrared transmitter 11 generates corresponding infrared optical signals 15.

When the key that is equipped according to the invention is inserted into the ignition lock, the infrared detector 1 is connected through by the interrogation pulse fed in as the infrared light beams 2, so that the node between the resistors 3 and 5 is drawn down essentially to ground potential and the capacitor 6 which has previously been charged begins to discharge. As a result, the capacitor potential slowly drops so that the base current of the pnp-type switching transistor 9 begins to flow, and the switching transistor 9 thus connects through with a time delay conditioned by the timing element 5, 6. The time constant of the RC element 5, 6 is preferably set so as to be shorter than the duration of the interrogation pulse so that the switching transistor 9 already goes into the connected-through state during the interrogation pulse, and thus supplies the infrared transmitter 11 with current. The infrared transmitter 11 itself then generates an infrared beam 15 which serves as response pulse and which signals the inserted key state to the vehicle-end evaluation logic.

When the interrogation pulse (infrared beam 2) ends, the infrared receiver goes back into the disabled state. The capacitor 6 then begins to charge via the resistors 3 and 5 so that its potential rises slowly. However, the switching transistor 9 remains initially in the switched-on state so that the response pulse (infrared beam 15) also continues to be generated after the interrogation pulse has been switched off. When the voltage of the capacitor has risen to such an extent that there is downward transgression of the base-emitter voltage difference necessary for connecting through the switching transistor 9, the switching transistor 9 switches off so that the infrared transmitter 11 is also deactivated.

A circuit arrangement 5, 6, 8, 9, 10 which is wired as a hardware circuit, which is activated directly by an interrogation pulse and which brings about the generation (with a time delay) of the response signal without the microprocessor module 7 being involved is thus provided in the embodiment shown in FIG. 1. The microprocessor module can thus remain in the quiescent state with correspondingly reduced current demand up to this point in time, i.e. during the entire preceding drawn-off state, and also possibly afterwards. Furthermore, there is, apart from the time delay which is selectively built in by means of the timing element 5, 6, no additional time delay due to the system so that the response pulse can be generated very rapidly. The circuit can also be designed in such a way that the response pulse is generated immediately at the start of the acquisition of the interrogation pulse and only the switching off of the response pulse takes place with a time delay in relation to the trailing edge of the interrogation pulse.

In the exemplary embodiment shown in FIG. 1, there is thus a bidirectional IR interface between the interrogation device (i.e., the evaluating control unit of the motor vehicle), and the ignition key. The infrared interface circuit in the key reacts in each case directly to a short infrared pulse emitted cyclically by the control unit with a short infrared response pulse. The (proper) response pulse signals to the control unit that the key is inserted in the lock. The response pulse is output here by the key with a short time lag so that it is present for a longer time than the input pulse. The evaluating control unit (designed as an electronic circuit) can thus ensure that a response pulse is actually acquired by the key and it is not, for example, just a reflection of its own interrogation pulse which is acquired.

In the exemplary embodiment explained above, the energy for the infrared response pulse is obtained from the battery (possibly rechargeable) in the key. However, it is also possible that as an alternative thereto in each case an inductive energy supply to the key is briefly set up by the control unit whenever the interrogation pulses are generated. This gives rise to somewhat increased power consumption in the control unit, but also permits the interrogation of keys which are not equipped with their own battery. Even in this alternative, the microprocessor which is contained in the key can remain in the stand-by mode (power-down mode) during the pulse interrogation and the generation of the response pulse.

In the exemplary embodiment shown in FIG. 1, the bidirectional, infrared interface is used to transmit the interrogation and response pulses. However, as an alternative it is also possible to use for this an inductive antenna, implemented for example as a coil, of the key and of the control unit, the control unit (interrogation device) cyclically transmitting short, individual current pulses, serving as interrogation pulses, to its inductive antenna in this case. This interrogation pulse is acquired by means of an LC oscillatory circuit in the key, in which case an evaluation circuit, connected to the LC oscillatory circuit, of the key acquires this incoming pulse and generates by means of its infrared transmitter a short infrared response pulse which signals the presence of the key to the control unit. The interrogation pulses and the response pulses thus run via different paths.

In this embodiment also, the energy for generating the infrared response pulses can be obtained from a battery (accumulator) in the key, or the energy necessary for generating the response pulses can also be transmitted to the key by the control unit. In the latter case, current pulse sequences are cyclically transmitted by the control unit to the inductive antenna of the control unit, the pulses transmitting the energy to the key. These pulse sequences are applied to a capacitor via a downstream rectifier using the LC oscillatory circuit in the key, in order to charge the capacitor to a specific voltage level that is adequate for supplying the key with voltage. The evaluation circuit in the key reacts to these pulses which are incoming on the LC oscillatory circuit, preferably to the switching-off edge of such pulses, by generating a short infrared response pulse. An exemplary embodiment which is configured for this is illustrated in FIG. 2.

The components in the key which are provided for acquiring interrogation pulses and generating response pulses are shown in FIG. 2, the further components which are contained in the key, for example the microprocessor 7, the infrared transmitter etc., not being illustrated. According to FIG. 2, an LC oscillatory circuit 16, 17 is provided which is designed as a parallel resonant circuit and contains an inductor 16 and a capacitor 17. These components form the inductive antenna of the key and acquire the interrogation pulses which are generated by the control unit and are fed in in the form of radio-frequency signals. The LC oscillatory circuit is connected to the anodes of two diodes 18, 19 whose cathodes are respectively connected to energy accumulator capacitors 20 and 21. In each case a voltage-limiting Zener diode 22 or 23 is connected in parallel to the energy accumulator capacitors 20 and 21. In addition, a resistor 24 for current limitation is connected between the diode 19 and the energy accumulator capacitor 21. If an interrogation pulse (or further pulses for supplying energy to the key) is received by means of the LC oscillatory circuit 16, 17, said pulse is used by the rectifying diodes 18 and 19 to charge the energy accumulator capacitors 20 and 21 so that the further circuit components which are not shown in FIG. 2 and are connected to the terminals illustrated on the right can be supplied with current.

The resistors 25, 26, 27 which are shown in FIG. 2, a pnp-type transistor 28, a resistor 29 and a capacitor 30 are provided for generating a response pulse in reaction to the end of the interrogation pulse, i.e. to the trailing edge of the interrogation pulse. These components 25 to 30 replace the circuit elements 5, 6 and 8 to 10 as shown in FIG. 1. The resistor 25 is connected between the cathode of the diode 18 and the emitter of the transistor 28, while the resistors 26 and 27 are connected serially between the base of the transistor 28 and ground. The connection point between the resistors 26 and 27 is connected to the cathode of the diode 19. The resistor 29 is connected between the collector of the transistor 28 and ground, while the capacitor 30 is connected as a series capacitor between the collector of the transistor 28 and an output terminal 31 to which the output signal serving to generate the response pulse is transmitted. The output terminal 31 can, for example, be connected to the cathode of the infrared light-emitting diode 11 (see FIG. 1). The output signal which is transmitted at the output terminal 31 can, however, also be used to generate a radio-frequency response pulse which is transmitted via the inductive antenna of the key. The connections and circuit components which are necessary for this are not illustrated in FIG. 2.

As long as an interrogation pulse is received via the LC oscillatory circuit 16, 17, the energy accumulator capacitors 20 and 21 are charged, the transistor 28 remaining switched off. After the end of the interrogation pulse, the energy accumulator capacitor 21 begins to discharge via the resistors 24 and 27, so that the potential present at the base of the transistor 28 drops. The transistor 28 therefore goes into the conductive state, so that a voltage pulse is generated by means of the elements 29 and 30, which pulse occurs at the output terminal 31 and causes the transmitting element to emit the interrogation pulse. The response pulse is thus generated directly after the interrogation pulse purely by circuitry means without involving a microprocessor, so that no appreciable time delay occurs and the control unit is thus informed immediately of the presence of the key.

It is also possible to provide a radio-frequency remote-control system instead of an infrared interface between the key and the control unit, that is to say to transmit the pulses as radio signals. In this case, not only the interrogation pulses but also the response pulses generated by the key are transmitted via the radio-frequency remote-control link to the interrogation device, that is to say to the evaluation logic in the control unit.

In a non-illustrated exemplary embodiment, the presence of the key may also be detected by means of the detuning of the inductive output circuit of the control unit which is brought about when the inductive load of the input oscillatory circuit of the key is present. The inductive load of the input oscillatory circuit of the key leads in fact to a change in the resonant frequency and thus to a detuning of the output circuit of the control unit. Since the inductive output circuit in the control unit and the inductive input circuit in the key are provided for the wireless supply of energy in this exemplary embodiment, no additional components are required. In this exemplary embodiment, the control unit compares the respective detuned state of its inductive output circuit which, when the key is not present, has a significantly different value from when the key is present. So that the presence of a key can be detected even better, there is preferably provision that when an interrogation pulse is acquired said key varies its load resistance over time with a suitable frequency or in accordance with a specific item of coded information which is known to the control unit. If the evaluation circuit of the control unit acquires this variation of the inductive detuning of the inductive output circuit of the control unit, this constitutes a reliable indication for the presence of the key. The variations over time take place here preferably relatively rapidly so that a short interrogation time can be realized and the consumption of current remains low.

We claim:

1. A device for detecting a key inserted into a lock of a motor vehicle, wherein, when the key is inserted in the lock, the key communicates via a communications link with a lock-end interrogation device emitting intermittent interrogation pulses, the device which comprises:
   a microprocessor, a transmitter connected to said microprocessor, and a receiver connected to said microprocessor; and
   a circuit arrangement connected directly between said transmitter and said receiver and bypassing said microprocessor, said receiver activating said circuit arrangement upon receiving an interrogation pulse and actuating said transmitter to transmit a response pulse in response to the interrogation pulse.

2. The device according to claim 1, wherein said circuit arrangement is adapted to time an end of the response pulse to lie after a trailing edge of the interrogation pulse.

3. The device according to claim 1, wherein said receiver is a receiving device selected from the group consisting of an infrared receiver and an inductive antenna, and said transmitter is a transmitting device selected from the group consisting of an infrared transmitter and a radio-frequency transmitter.

4. The device according to claim 1, wherein said circuit arrangement is a timing element adapted to delay a switching off of the response pulse in relation to a trailing edge of the interrogation pulse.

5. The device according to claim 4, wherein said circuit arrangement is an RC element.

6. The device according to claim 1, wherein said receiver includes an LC oscillatory circuit, and including an energy accumulator connected to and chargeable by said LC oscillatory circuit, and wherein said circuit arrangement is adapted to respond to an interrogation pulse sensed by said LC oscillatory circuit and to generate a response pulse in reaction thereto.

7. The device according to claim 1, wherein said receiver includes an inductive input circuit, and including an interrogation device containing an inductive output circuit, and wherein the response pulses generated by said transmitter consist in a change in a load resistance over time, leading to corresponding change in a detuning of said inductive output circuit of said interrogation device caused by the detuning of the inductive input circuit of the key.

8. The device according to claim 7, wherein the load resistance changes at a specific frequency.

9. The device according to claim 7, wherein the load resistance changes in accordance with a coded item of information.

10. A key for a motor vehicle with a system for detecting whether the key is inserted in a lock of the motor vehicle, comprising:
    a receiver for sensing externally fed-in signals, a microprocessor and a transmitter for transmitting signals to an outside of the key;
    a circuit arrangement connected directly between said transmitter and said receiver and bypassing said microprocessor, said circuit arrangement controlling said transmitter to generate a response pulse when an interrogation pulse is received by said receiver.

11. The key according to claim 10, wherein said circuit arrangement includes a timing element for delaying a trailing edge of the response signal relative to a trailing edge of a received signal.

12. The key according to claim 10, wherein said circuit arrangement responds to a trailing edge of a received signal and generates a response pulse in reaction thereto.

13. In combination with a motor vehicle and a key for the motor vehicle, a device for detecting whether the key is inserted into a lock of the motor vehicle, which comprises:
    a communications link between the key and the motor vehicle whereby, when the key is inserted in the lock, the key communicates via the communications link with a lock-end interrogation device emitting intermittent interrogation pulses;
    a microprocessor, a transmitter connected to said microprocessor, and a receiver connected to said microprocessor; and
    a circuit arrangement connected directly between said transmitter and said receiver and bypassing said microprocessor, said receiver activating said circuit arrangement upon receiving an interrogation pulse from the lock-end interrogation device and actuating said transmitter to transmit a response pulse to the interrogation device in response to the interrogation pulse.

14. The device according to claim 13, wherein the key contains an LC oscillatory circuit with an energy accumulator to be charged by means of said LC oscillatory circuit, for supplying energy to the key, and wherein said circuit arrangement in the key is adapted to respond to an interrogation pulse sensed by said LC oscillatory circuit, and to generate a response pulse in reaction thereto.

15. The device according to claim 13, wherein the key contains an inductive input circuit, and the interrogation device contains an inductive output circuit, and wherein the response pulses generated by the key consist in a change in its load resistance over time, and a detuning of the inductive input circuit of the key bringing about a corresponding change in the detuning of the inductive output circuit of the interrogation device.

16. The device according to claim 15, wherein a load resistance of the key changes with a specific frequency.

17. The device according to claim 15, wherein a load resistance of the key changes in accordance with a coded item of information.

* * * * *